United States Patent
Mientus et al.

(10) Patent No.: US 6,846,531 B2
(45) Date of Patent: Jan. 25, 2005

(54) WATER-ABSORBENT FILM CONSTRUCTION

(75) Inventors: Bernard S. Mientus, Painesville, OH (US); Dana M. Boyd, Painesville, OH (US); Ramin Heydarpour, Beverly Hills, CA (US); Sriram Vankatasanthanam, Chino Hills, CA (US); Prakash Mallya, Sierra Madre, CA (US); Norman Yamamoto, Yorba Linda, CA (US); Frank Yenjir Shih, Arcadia, CA (US); Chitto R. Sarkar, Brea, CA (US); Christine K. Hibberd, Irvine, CA (US); Zhisong Huang, San Dimas, CA (US); Arthur G. Castillo, Chino Hills, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/785,639

(22) Filed: Feb. 24, 2004

(65) Prior Publication Data

US 2004/0142126 A1 Jul. 22, 2004

Related U.S. Application Data

(62) Division of application No. 10/096,529, filed on Mar. 11, 2002.

(51) Int. Cl.[7] .................................................. B32B 1/02
(52) U.S. Cl. ..................... 428/35.2; 428/40.1; 428/137; 428/192; 402/79; 40/537; 281/38
(58) Field of Search ........................ 428/35.2, 40.1, 428/192; 402/79; 281/38; 40/537

(56) References Cited

U.S. PATENT DOCUMENTS

| | | | |
|---|---|---|---|
| 854,710 A | 5/1907 | Barker et al. | |
| 1,510,110 A | 9/1924 | Schmidt | |
| 2,120,673 A | 6/1938 | Meadows | |
| 2,335,739 A | 11/1943 | Chamberlin | 117/86 |
| 2,527,530 A | 10/1950 | Carsel et al. | 260/13 |
| 2,556,825 A | 6/1951 | Smith | 40/2 |
| 2,583,403 A | 1/1952 | Wiser | 281/27 |
| 2,879,609 A | 3/1959 | Watkins | 35/62 |

(List continued on next page.)

FOREIGN PATENT DOCUMENTS

| | | |
|---|---|---|
| CA | 1294180 | 1/1992 |
| EP | 0 199 874 | 11/1986 |
| EP | 0 289 859 A2 | 11/1988 |
| EP | 0 705 704 A2 | 4/1996 |
| EP | 0 775 596 A1 | 5/1997 |
| EP | 0 655 346 B1 | 9/1998 |
| WO | 92/00188 | 1/1992 |
| WO | 96/08377 | 3/1996 |
| WO | 96/18496 | 6/1996 |
| WO | 97/01448 | 1/1997 |
| WO | 97/20697 | 6/1997 |
| WO | 99/04981 | 2/1999 |
| WO | 01/76885 A2 | 10/2001 |

*Primary Examiner*—Alexander S. Thomas
(74) *Attorney, Agent, or Firm*—Renner, Otto, Boisselle & Sklar, LLP

(57) ABSTRACT

This invention relates to a water-absorbent film construction, comprising: a water-absorbent film layer overlying a base layer, the water-absorbent film layer being comprised of at least about 40% by weight of at least one 2-oxazoline polymer.

33 Claims, 2 Drawing Sheets

U.S. PATENT DOCUMENTS

| | | | |
|---|---|---|---|
| 3,043,737 A | 7/1962 | Engelstein | 156/196 |
| 3,083,988 A | 4/1963 | Hertelendy | 281/19 |
| 3,158,525 A | 11/1964 | Reynolds | 161/72 |
| 3,257,128 A | 6/1966 | Schneider | 281/39 |
| 3,299,928 A | 1/1967 | Inkley | 150/39 |
| 3,565,462 A | 2/1971 | Gottlieb | 281/3 |
| 4,139,965 A | 2/1979 | Curry et al. | 46/1 R |
| 4,212,393 A | 7/1980 | Lenkoff | 206/575 |
| 4,438,175 A | 3/1984 | Ashcraft et al. | 428/315.5 |
| 4,503,111 A | 3/1985 | Jaeger et al. | 428/195 |
| 4,566,721 A | 1/1986 | Friedman et al. | 281/31 |
| 4,575,465 A | 3/1986 | Viola | 427/261 |
| 4,592,951 A | 6/1986 | Viola | 428/323 |
| 4,613,525 A | 9/1986 | Miyamoto et al. | 427/256 |
| 4,629,349 A | 12/1986 | Pitts | 402/74 |
| 4,678,833 A | 7/1987 | McCreedy et al. | 525/66 |
| 4,741,969 A | 5/1988 | Hayama et al. | 428/514 |
| 4,861,644 A | 8/1989 | Young et al. | 428/195 |
| 4,892,779 A | 1/1990 | Leatherman et al. | 428/220 |
| 4,943,088 A | 7/1990 | Wada | 281/39 |
| 5,002,825 A | 3/1991 | Mimura et al. | 428/315.5 |
| 5,029,899 A | 7/1991 | Schieppati et al. | 281/30 |
| 5,100,181 A | 3/1992 | Nathans et al. | 283/109 |
| 5,196,237 A | 3/1993 | May | 427/288 |
| 5,213,873 A | 5/1993 | Yasuda et al. | 428/195 |
| 5,270,103 A | 12/1993 | Oliver et al. | 428/219 |
| 5,352,503 A | 10/1994 | Drake et al. | 428/195 |
| 5,372,506 A | 12/1994 | Hambright | 434/84 |
| 5,422,175 A | 6/1995 | Ito et al. | 428/304.4 |
| 5,462,807 A | 10/1995 | Halle et al. | 428/500 |
| 5,468,553 A | 11/1995 | Koike et al. | 428/224 |
| 5,472,239 A | 12/1995 | Trujillo | 283/34 |
| 5,494,733 A | 2/1996 | Koike et al. | 428/224 |
| 5,494,759 A | 2/1996 | Williams et al. | 428/514 |
| 5,518,764 A | 5/1996 | Traubel et al. | 427/209 |
| 5,605,750 A | 2/1997 | Romano et al. | 428/304.4 |
| 5,635,297 A | 6/1997 | Ogawa et al. | 428/342 |
| 5,658,977 A | 8/1997 | Yang et al. | 524/503 |
| 5,662,997 A | 9/1997 | Onishi et al. | 428/331 |
| 5,698,478 A | 12/1997 | Yamamoto et al. | 442/153 |
| 5,711,627 A | 1/1998 | Chapman | 402/3 |
| 5,721,086 A | 2/1998 | Emslander et al. | 430/126 |
| 5,722,694 A | 3/1998 | Baldursson | 283/116 |
| 5,747,148 A | 5/1998 | Warner et al. | 428/212 |
| 5,764,262 A | 6/1998 | Wu et al. | 347/101 |
| 5,799,978 A | 9/1998 | Grinnell | 281/29 |
| 5,806,894 A | 9/1998 | Dottel | 281/38 |
| 5,853,859 A | 12/1998 | Levy et al. | 428/196 |
| 5,857,797 A | 1/1999 | Streff et al. | 402/4 |
| 5,876,143 A | 3/1999 | Ong | 402/3 |
| 5,890,774 A | 4/1999 | Schwartz et al. | 281/31 |
| 5,891,811 A | 4/1999 | Ashida et al. | 442/71 |
| 5,931,505 A | 8/1999 | Malpass et al. | 281/29 |
| D419,186 S | 1/2000 | Moor | D19/27 |
| 6,012,866 A | 1/2000 | Podosek | 402/79 |
| 6,017,164 A | 1/2000 | Abbott | 402/73 |
| 6,019,539 A | 2/2000 | Lynton | 402/79 |
| 6,030,140 A | 2/2000 | Karten et al. | 402/73 |
| 6,127,037 A | 10/2000 | Sargeant et al. | 428/411.1 |
| 6,194,075 B1 | 2/2001 | Sargeant et al. | 428/447 |
| 6,194,077 B1 | 2/2001 | Yuan et al. | 428/478.2 |
| 6,196,750 B1 | 3/2001 | Hansen | 402/79 |
| 6,211,304 B1 | 4/2001 | Farooq | 525/403 |
| 6,241,286 B1 | 6/2001 | Ogura et al. | 281/29 |
| 6,565,949 B1 | 5/2003 | Wang et al. | 428/32.24 |
| 6,623,841 B1 | 9/2003 | Venkatasanthanam et al. | 428/323 |

WATER-ABSORBENT FILM CONSTRUCTION

This application is a divisional application of U.S. patent application Ser. No. 10/096,529, filed Mar. 11, 2002, pending.

TECHNICAL FIELD

This invention relates to water-absorbent film constructions. More particularly, this invention relates to a water-absorbent film construction comprising a water-absorbent film layer overlying a base layer, the water-absorbent film layer being comprised of at least about 40% by weight of a 2-oxazoline polymer.

BACKGROUND OF THE INVENTION

Polymers of 2-oxazolines are known to be hydrophilic water-soluble materials. These polymers have utility as adhesion promoters and viscosity modifiers. Unfortunately, however, these polymers when formed into solid articles such as films exhibit poor mechanical properties. For example, dried films of 2-oxazoline polymers are too brittle to be useful in many applications and water often causes dissolution of such films.

Despite mechanical problems which limit the utility of these polymers, 2-oxazoline polymers have many desirable properties and it would be advantageous if they could be utilized in a film construction. The problem therefore is to pprovide a film construction containing a 2-oxazoline polymer that takes advantage of the desirable properties of this polymer and yet exhibits sufficient mechanical and physical properties to be of practical use. This problem has been overcome with the present invention.

U.S. Pat. No. 4,678,833 discloses miscible blends of poly-2-oxazolines and thermoplastic polymers. These blends are described as being useful as membranes for separating components of liquid mixtures such as water/ethanol or ethanol/hexane mixtures.

SUMMARY OF THE INVENTION

This invention relates to a water-absorbent film construction, comprising: a water-absorbent film layer overlying a base layer, the water-absorbent film layer being comprised of at least about 40% by weight of at least one 2-oxazoline polymer.

In one embodiment of the invention, the base layer has a first side and a second side, the water-absorbent film layer overlies the first side, and a skin layer overlies the second side.

In one embodiment of the invention, the inventive film construction further comprises a tie layer positioned between the water-absorbent film layer and the base layer.

In one embodiment of the invention, the base layer has a first side and a second side, the water-absorbent film layer overlies the first side, a tie layer is positioned between the water-absorbent film layer and the base layer, and a skin layer overlies the second side.

In one embodiment of the invention, the base layer has a first side and a second side, the water-absorbent film layer overlies the first side, a skin layer overlies the second side, and an adhesive layer overlies the skin layer. In one embodiment, the adhesive layer is comprised of a pressure sensitive adhesive, and a release liner overlies the pressure sensitive adhesive.

In one embodiment, the invention relates to a water-absorbent film construction, comprising: a water-absorbent film layer having a 2-oxazoline polymer concentration of at least about 40% by weight; a base layer, the base layer having a first side and a second side, the water-absorbent film layer overlying the first side of the base layer; and a skin layer comprising at least one heat-activatable adhesive material overlying the second side of the base layer.

In one embodiment, the invention relates to a write-on sheet protector, comprising: an envelope having an outer surface and an inner surface and being formed of a transparent coextruded sheet material; the sheet material comprising a water-absorbent film layer having a 2-oxazoline polymer concentration of at least about 40% by weight, a base layer, the base layer having a first side and a second side, the water-absorbent film layer overlying the first side of the base layer, and a skin layer overlying the second side of the base layer; the skin layer forming the inner surface of the envelope; the water-absorbent film layer forming the outer surface of the envelope; the other surface of the envelope being an ink receptive surface.

BRIEF DESCRIPTION OF THE DRAWINGS

In the annexed drawing, like references indicate like parts or features.

DETAILED DESCRIPTION OF THE INVENTION

Figure 7:
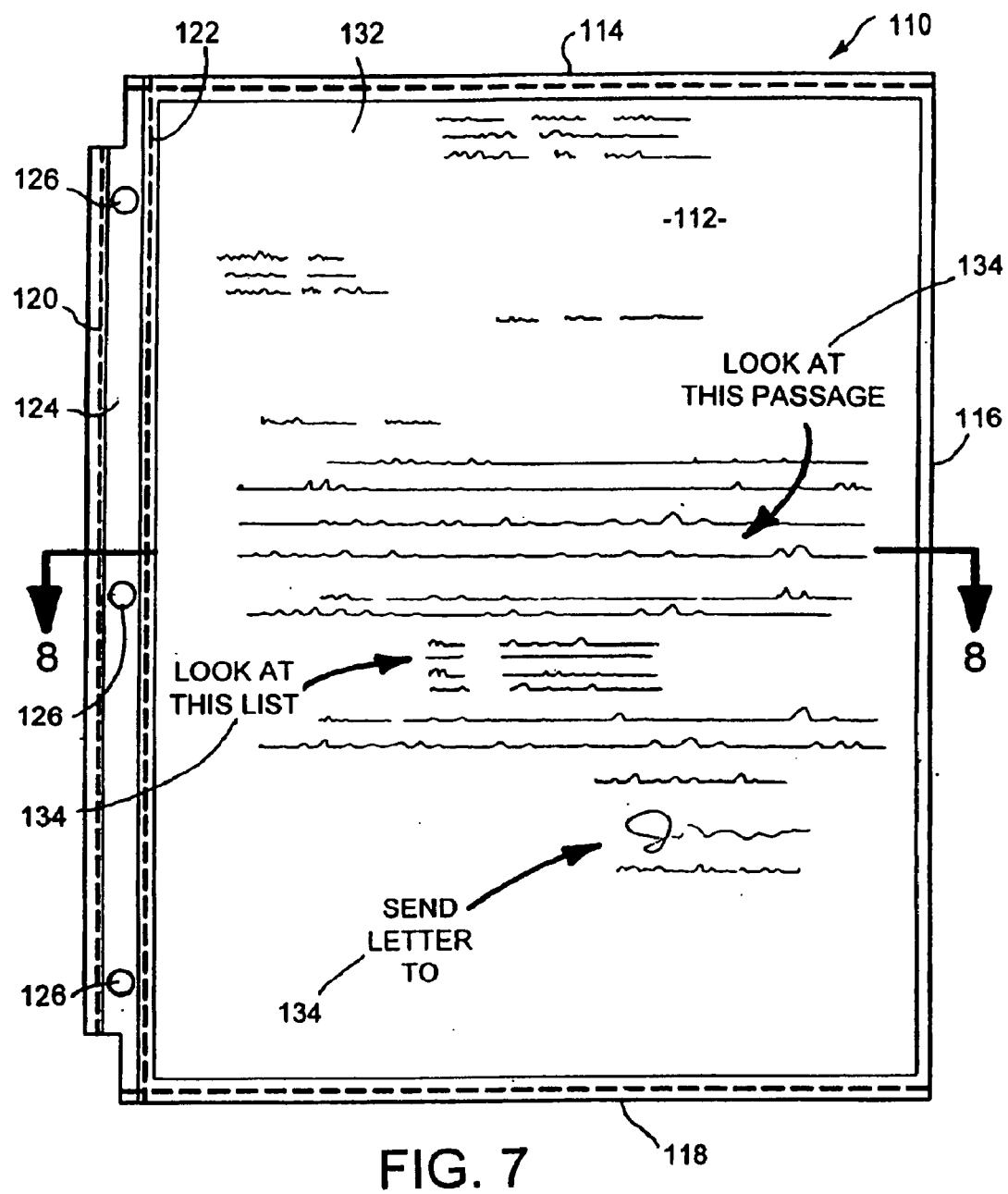
FIG. 7 is a plan view of a write-on sheet protector embodying the present invention in a particular form.
Figure 8:
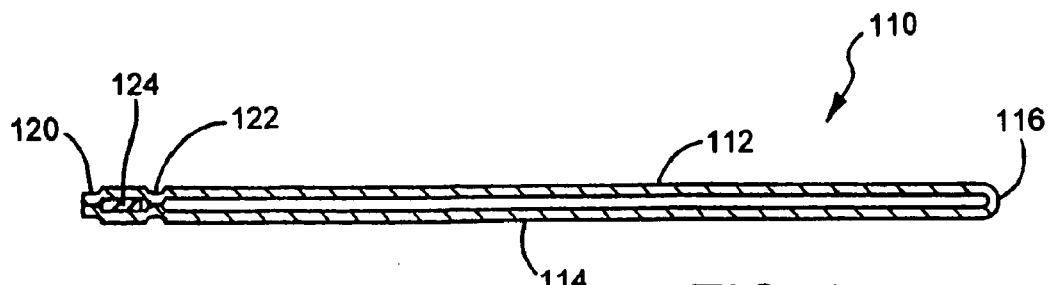
FIG. 8 is a cross-sectional view taken along line 8—8 in FIG. 7.

The inventive water-absorbent film constructions are characterized by a water-absorbent film layer overlying at least one side of a base layer. The water absorbent film layer has a 2-oxazoline polymer concentration of at least about 40% by weight. These film constructions have a number of utilities. For example, in one embodiment, the water-absorbent film layer functions as an ink receptive layer. This permits use of the inventive film construction in making labels, label stocks, and the like. It also permits use of the inventive film constructions in ink jet printing applications. In one embodiment, the inventive film construction is useful in making a transparent film sheet protector that is capable of receiving written information on its exterior surface. This is depicted in FIGS. 7 and 8 and is discussed in greater detail below. In one embodiment, the invention relates to film constructions having non-skid or non-slip surfaces. In one embodiment, the invention relates to film constructions with water-absorbing anti-static surfaces, and film constructions with adhesive layers for laminating the base layer to a paper substrate. In one embodiment, the invention relates to film constructions that are useful as anti-fog films. Other uses include wash away labels, moisture indicators (e.g., for disposable packages, diapers, etc.), security labels, and the like.

An advantage of the invention is that by combining the water-absorbent film layer with the base layer, the inventive film constructions take advantage of the desirable properties provided by the 2-oxazoline polymer in the water-absorbent film layer, and yet exhibit the necessary mechanical and physical properties provided by the base layer. This results in film constructions that are practical to use.

The term "water-absorbent film layer" refers to a film layer that can absorb water to the extent of at least about 0.1% by weight of its weight at 20° C. In one embodiment, the water-absorbent film layer may absorb from about 0.1 to about 35% by weight of its weight, and in one embodiment about 0.1 to about 20% by weight of its weight, and in one embodiment about 0.1 to about 10% by weight of its weight, and in one embodiment about 0.1 to about 5% by weight of its weight, and in one embodiment about 0.1 to about 2% by weight of its weight, and in one embodiment about 0.1 to about 1.5% by weight of its weight, and in one embodiment about 0.1 to about 1% by weight of its weight, and in one embodiment about 0.25 to about 0.5% by weight of its weight at 20° C.

The term "water-soluble polymer" refers to a polymer that is soluble in water to the extent of at least about 1 gram of polymer per liter of water at 20° C., and in one embodiment at least about 10 grams of polymer per liter of water, and in one embodiment at least about 100 grams of polymer per liter of water at 20° C.

The term "water-insoluble polymer" refers to a polymer that is not a water-soluble polymer as defined above.

Figure 1:
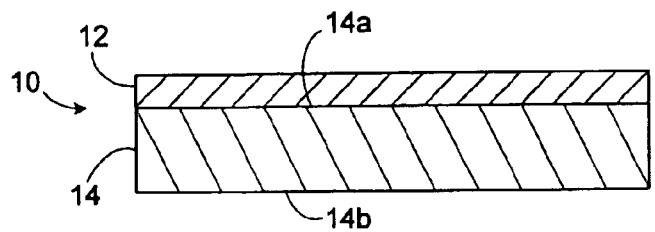
FIG. 1 is a schematic illustration of the side view of a water-absorbent film construction embodying the present invention in a particular form.

The term "overlies" and cognate terms such as "overlying" and the like, when referring to the relationship of one or a first film layer relative to another or a second film layer, refers to the fact that the first layer partially or completely lies over the second layer. The first layer overlying the second layer may or may not be in contact with the second layer. For example, one or more additional layers may be positioned between the first layer and the second layer. The inventive water-absorbent film construction, which is depicted in one of its illustrated embodiments in FIG. 1, is generally indicated by the reference numeral 10, and is comprised of water-absorbent film layer 12 which overlies a base layer 14. The base layer 14 has a first side 14a and a second side 14b. The water-absorbent film construction 10A depicted in FIG. 2 is identical to the film construction 10 depicted in FIG. 1 except that the film construction 10A includes skin layer 16 which overlies the second side 14b of base layer 14.

Figure 3:
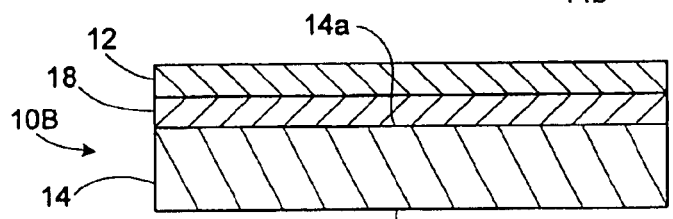
FIG. 3 is a schematic illustration of the side view of still another embodiment of the water-absorbent film construction of the present invention.

The water-absorbent film construction 10B depicted in FIG. 3 is identical to the film construction 10 depicted in FIG. 1 except that film construction 10B includes tie layer 18 which is positioned between the water-absorbent film layer 12 and the first side 14a of base layer 14. Tie layer 18 may be comprised of one or more layers of an adhesive resin.

Figure 4:
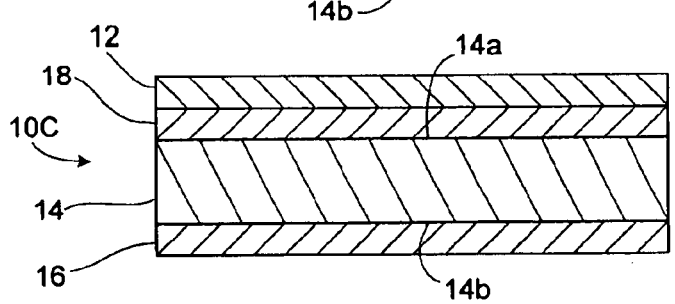
FIG. 4 is a schematic illustrationof the side view of still another embodiment of the water-absorbent film construction of the present invention.

The water-absorbent film construction 10C depicted in FIG. 4 is identical to the film construction 10B depicted in FIG. 3 except that film construction 10C includes skin layer 16 which overlies the second side 14b of base layer 14.

Figure 2:
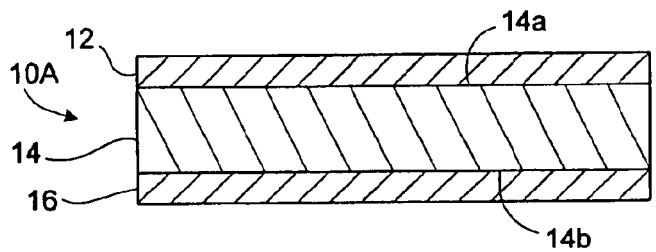
FIG. 2 is a schematic illustration of the side view of an alternative embodiment of the water-absorbent film construction of the present invention.
Figure 5:
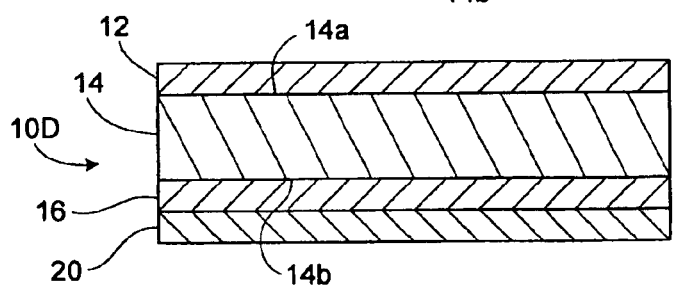
FIG. 5 is a schematic illustration of the side view of still another embodiment of the water-absorbent film construction of the present invention.

The water-absorbent film construction 10D depicted in FIG. 5 is identical to the film construction 10A depicted in FIG. 2 except that film construction 10D includes adhesive layer 20 which overlies skin layer 16.

Figure 6:
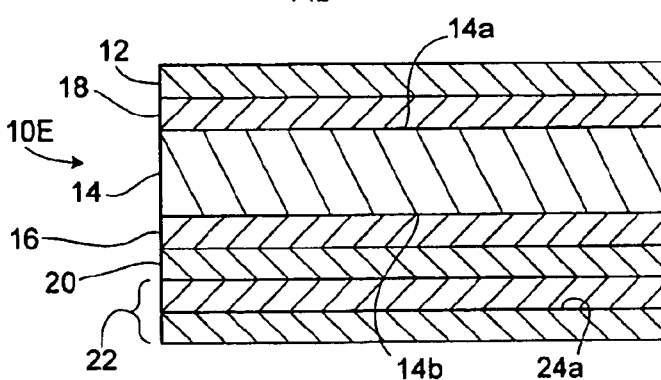
FIG. 6 is a schematic illustration of the side view of still another embodiment of the water-absorbent film construction of the present invention.

The water-absorbent film construction 10E depicted in FIG. 6 is identical to the film construction 10D depicted in FIG. 5 except that film construction 10E includes tie layer 18 which is positioned between the water-absorbent film layer 12 and the first side 14a of base layer 14. This film construction also includes a release liner 22 which overlies adhesive layer 20. In this embodiment, adhesive layer 20 is a pressure sensitive adhesive layer. The release liner 20 is comprised of backing liner 24 and a release coating 26 applied to surface 24a of backing liner 24. The release coating 26 is preferentially adhered to backing liner 24 such that when the release liner 22 is separated from the adhesive layer 20, the release coating 26 remains adhered to the backing liner 24.

The water-absorbent film layer 12 may have a thickness of about 0.1 to about 2 mils, and in one embodiment about 0.25 to about 1 mil. The base layer 14 may have a thickness of about 1 to about 10 mils, and in one embodiment about 2 to about 5 mils. The skin layer 16 may have a thickness of about 0.1 to about 2 mils, and in one embodiment about 0.25 to about 1 mil.

The 2-oxazoline polymers used in the water-absorbent film layer 12 are polymers containing repeating units represented by the formula:

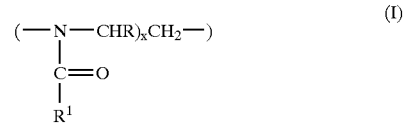

$$(-\!\!-\!\!N\!\!-\!\!CHR)_x CH_2\!\!-\!\!) \quad (I)$$
$$\begin{array}{c} | \\ C=O \\ | \\ R^1 \end{array}$$

These polymers may be prepared by a ring opening polymerization of 2-oxazoline monomers represented by the formula:

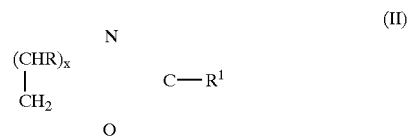

$$(II)$$

In formulae (I) and (II), R is hydrogen or an alkyl group of 1 to about 4 carbon atoms. $R^1$ is hydrogen, a phenyl group or an alkyl group of 1 to about 4 carbon atoms. x is 1 or 2. In one embodiment, x is 1, each R is hydrogen and $R^1$ is an alkyl group of 1 to about 4 carbon atoms. In one embodiment, the 2-oxazoline monomer is 2-ethyl-2-oxazoline. In one embodiment, the 2-oxazoline polymer is poly(2-ethyl-2-oxazoline).

The ring-opening polymerization of the 2-oxazoline monomers may be conducted in the presence of a cationic polymerization catalyst at a reaction temperature of about 0° C.–200° C. The catalyst may be a strong mineral acid, an organic sulfonic acid or an ester thereof, an acidic salt such as ammonium sulfate, a Lewis acid such as aluminum trichloride, stannous tetrachloride, boron trifluoride, a organic diazonium fluoroborate, a dialkyl sulfate, and the like.

The polymer obtained in the polymerization of the 2-oxazoline monomers may be a linear, N-acylated polyalkyleneimine having a molecular structure containing repeating units represented by formula (I). A portion of the N-acyl groups may be hydrolyzed.

The term "2-oxazoline" is used herein to describe compounds having the structure defined by formula (II), including compounds wherein x is 2. R and $R^1$ may be inertly substituted. The term "inertly substituted" means that the moiety referred to contains no substituent group which interferes with the polymerization of the 2-oxazoline. Illustrative inert substituents include alkyl, alkenyl, alkoxy and the like. Exemplary R groups include hydrogen, methyl, ethyl, propy, and the like. Exemplary $R^1$ groups include hydrogen, methyl, ethyl, propyl, pentyl, cyclohexyl, and the like.

The 2-oxazoline polymer is water soluble and may have a molecular weight in the range of about 50,000 to about 1,000,000, and in one embodiment about 100,000 to about 800,000, and in one embodiment about 300,000 to about 700,000, and in one embodiment about 500,000. The molecular weight may be determined by gel permeation chromatography. These polymers may have a kinematic viscosity in the range of about 18 to about 100 cSt, and in one embodiment about 18 to about 24 cSt, and in one embodiment about 60 to about 80 cSt. These polymers may have a poly-dispersity in the range of about 3 to about 4.

Included among the commercially available 2-oxazoline polymers that may be used are the poly(2-ethyl-2-oxazoline) polymers available from Polymer Chemistry Innovations, Inc. under the tradename Aquazol. The products that may be used include those identified as follows:

| Product | Target Molecular Weight | Poly-Dispersity Range | Kinematic Viscosity Range |
|---|---|---|---|
| Aquazol 200 | 300,000 | 3–4 | 18–24 cSt |
| Aquazol 500 | 500,000 | 3–4 | 60–80 cSt |

The 2-oxazoline polymer may be blended with one or more additional water-soluble polymers. These additional water-soluble polymers include polyvinyl alcohol, polyvinyl pyrrolidone, polyacrylic-acid, polymethyl methacrylate, polymethyl methacrylic-acid, styrene maleic anhydride, methyl cellulose, ethyl cellulose, carboxymethyl cellulose, hydroxyethyl cellulose, polyethylene oxide, polyethyleneimine, and mixtures thereof.

The 2-oxazoline polymer may be blended with one or more water-insoluble polymers. The water-insoluble polymers that are useful include polyolefins such as polyethylene, polypropylene, polybutylene, polystyrene, and the like. These water-insoluble polymers are either compatible with the 2-oxazoline polymer and, if used, the water-soluble polymer, or can be rendered compatible with the 2-oxazoline polymer and water-soluble polymer by blending the polymers with a suitable compatibilizing agent.

Compatibilizing agents that may be used include anhydride modified polyolefins such as anhydride modified polypropylene; anhydride modified polyethylene; anhydride-modified ethylene vinyl acetate; anhydride modified ethylmethyl acrylate; anhydride modified ethylene ethyl acrylate; anhydride modified ethyl acrylic acid; anhydride modified ethyl glycidyl methacrylate; anhydride modified ethyl, n-butyl acrylate; and copolymers, terpolymers and mixtures thereof. Useful anhydride modified polyolefins include the anhydride modified ethylene vinyl acetates available from DuPont under the tradename Bynel®.

The concentration of the 2-oxazoline polymer in the water-absorbent film layer 12 may range from about 40% to about 100% by weight, and in one embodiment about 50% to about 95% by weight, and in one embodiment about 60% to about 90% by weight, and in one embodiment about 65% to about 75% by weight. The concentration of the additional water-soluble polymer may range up to about 30% by weight, and in one embodiment up to about 20% by weight, and in one embodiment up to about 10% by weight. The concentration of the water-insoluble polymer may range up to about 60% by weight, and in one embodiment from about 5% to about 50% by weight, and in one embodiment about 10% to about 40% by weight, and in one embodiment about 25% to about 35% by weight. The concentration of the compatibilizing agent may range up to about 40% by weight, and in one embodiment from about 5% to about 30% by weight, and in one embodiment from about 10% to about 20% by weight.

The water-absorbent film layer 12 may further comprise one or more cationic modifiers, wetting agents, colloidal silica, inherently dissipative polymers, water proofing agents, anti-static agents, or mixtures of two or more thereof. Each of these may be present at a concentration of up to about 10% by weight, and in one embodiment up to about 5% by weight.

The base layer 14 may be comprised of metal foil, polymer film, paper sheet, or combinations thereof. The base layer 14 may be comprised of textile including woven and non-woven fabrics made of natural or synthetic fibers. The base layer 14 may be a single-layered construction or it may be a multi-layered construction. These include polymeric films and multi-layered polymeric films. The multi-layered constructions have two or more layers, and in one embodiment about two to about nine layers, and in one embodiment about two to about seven layers, and in one embodiment about three to about five layers. The layers of such multi-layered constructions may have the same composition and/or size or they may be different.

The metal foils include foils of such metals as copper, gold, silver, tin, chromium, zinc, nickel, platinum, palladium, iron, aluminum, steel, lead, brass, bronze, and alloys of the foregoing metals. Examples of such alloys include copper/zinc, copper/silver, copper/tin/zinc, copper/phosphorus, chromium/molybdenum, nickel/chromium, nickel/phosphorous, and the like. The metal foils can be used by themselves or they can be joined or adhered to a polymeric sheet or film to form a multi-layered laminate or construction.

The polymer films include polyolefins (linear or branched), polyamides, polystyrenes, nylon, polyesters, polyester copolymers, polyurethanes, polysulfones, styrene-maleic an hydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of α-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.940 to about 0.965 g/cm³. An example of a commercially available material that is useful is available from Du Pont under the trade designation Mylar LB; this material is identified as being a biaxially oriented polyester film. Films prepared from blends of copolymers or blends of copolymers with homopolymers also are useful. The films may be extruded as monolayered films or multi-layered films. The films may be oriented films or nonoriented films.

The paper sheets include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

The base layer 14 may be comprised of a polymer-coated paper which is basically a sheet of paper that is coated on either one or both sides with a polymer coating. The polymer coating, which may be comprised of a high, medium, or low density polyethylene, polypropylene, polyester, and other similar polymer films, is coated on the paper surface to add strength and/or dimensional stability. The weight of these types of coated paper facestocks can vary over a wide range with weights in the range of about 5 to about 50 lb/ream being useful. In total, the final coated paper facestock may be comprised of between about 10% and about 40% by weight polymer. For two-sided coatings, the quantity of polymer is usually approximately evenly divided between the top and bottom surface of the paper.

The skin layer 16 may be made from any heat-activatable adhesive material, thermoplastic film-forming material, or mixture thereof. The heat-activatable adhesive materials may be polymers (e.g., homopolymers, copolymers, terpolymers, etc.) containing carbonyl or hydroxyl groups or a combination thereof. These polymers are non-tacky to the touch until activated by the application of heat at which time they become tacky to the touch. The term "non-tacky to the touch" refers to an adhesive that when cast as a film and dried does not feel sticky or tacky at room temperature (about 20° C.) and normal relative humidity (less than about 25% RH). The heat-activatable adhesives that can be used include polyamides such as nylon, polyester copolymers, ionomers based on sodium or zinc salts of ethylene methacrylic acid, polyacrylonitriles, ethylene-vinyl acetate copolymers, and mixtures of two or more thereof. Included in this group are acrylate copolymers such as ethylene methacrylic acid, ethylene methyl acrylate, ethylene acrylic acid, ethylene ethyl acrylate, and the like. The ethylene methyl acrylate copolymers available from Chevron under the tradename EMAC can be used. TC 120, a product available from ExxonMobil identified as an ethylene methyl acrylate copolymer, can be used. USEP 307, a product available from Equistar identified as an ethylene vinyl acetate copolymer, can be used.

The thermoplastic film-forming material may be any thermoplastic film-forming material known in the art. These include linear or branched polyolefins. The polyolefins may be amorphous polyolefins. The polyolefins include polymers and copolymers of olefin monomers having 2 to about 12 carbon atoms, and in one embodiment 2 to about 8 carbon atoms, and in one embodiment 2 to about 4 carbon atoms. These include the polymers of alpha-olefins. The polyolefins include polyethylene, polypropylene, poly-1-butene, etc. The polyethylenes that are useful have various densities including low, medium and high density ranges as defined above. Ethylene-propylene copolymers, including those available from Dow under the trade designation DS6D81, can be used.

The base layer 14, when in the form of a polymer film, and the skin layer 16 may be transparent or pigmented. In one embodiment, one of these layers is transparent and the other is pigmented. In one embodiment, neither of these layers contain pigment and both layers are transparent. The pigments that can be used include titanium dioxide, both rutile and anatase crystal structure. In one embodiment, the pigment that is used is in the form of a concentrate containing the pigment and a resin carrier. The concentrate may contain, for example, about 20% to about 80% by weight pigment, and about 20% to about 80% by weight resin carrier. The resin carrier can be any thermoplastic polymer having a melting point in the range of about 100° C. to about 265° C. Examples include polyethylene, polypropylene, polybutylene, polyester, nylon and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename PolyBatch White P8555 SD, which is identified as a white color concentrate having a coated rutile titanium dioxide concentration of 50% by weight in a polypropylene homopolymer carrier resin. Another example is Ampacet 110233 which is a product of Ampacet Corporation identified as a $TiO_2$ concentrate containing 50% rutile $TiO_2$ and 50% low density polyethylene. The concentration of pigment in the base layer and/or skin layer 16 may be up to about 25% by weight, and when used is generally in the range of about 5% to about 25% by weight, and in one embodiment about 10% to about 20% by weight.

The base layer 14 and/or skin layer 16 may include a filler material to increase opacity. The fillers that can be used include calcium carbonate and talc. In one embodiment, the filler is added in the form of a concentrate containing the filler and a resin carrier. The concentrate may contain, for example, about 20% to about 80% by weight filler, and about 20% to about 80% by weight resin carrier. The resin carrier can be any thermoplastic polymer having a melting point in the range of about 100° C. to about 265° C. Examples include polyethylene, polypropylene, polybutylene, polyester, nylon, and the like. Also included are thermoplastic copolymers such as ethylene methylacrylate, and the like. In one embodiment, a calcium carbonate concentrate is used which is comprised of a blend of about 50% to about 80% by weight polypropylene and about 20% to about 50% by weight calcium carbonate. An example of a commercially available pigment concentrate that can be used is available from A. Schulman Inc. under the tradename PF 920, which is identified as a calcium carbonate concentrate having a calcium carbonate concentration of 40% by weight in a polypropylene homopolymer carrier resin. Another example is Ampacet 101087 which is a product of Ampacet Corporation identified as a calcium carbonate concentrate containing 30% by weight calcium carbonate and 70% by weight ethylene methylacrylate. The concentration of filler in the base layer 14 and/or skin layer 16 may be up to about 40% by weight, and when used is generally in the range of about 10% to about 40% by weigh, and in one embodiment about 10% to about 35% by weight.

The base layer 14 and/or skin layer 16 may contain one or more slip additives. These include primary amides such as stearamide, behenamide, oleamide, erucamide, and the like; secondary amides such as stearyl erucamide, erucyl erucamide, oleyl palmitamide, stearyl stearamide, erucyl stearamide, and the like; ethylene bisamides such as N,N'-ethylenebisstearamide, N,N'-ethylenebisolemide and the like; and combinations of any two or more of the foregoing amides. An example of a useful slip additive is available from A. Schulman under the trade Sper 6; this product is identified as a concentrate containing 6% by weight of an unsaturated $C_{17}$ fatty acid amide dispersed in polypropylene. The slip additive may be used at a concentration in the range of up to about 4% by weight, and in one embodiment about 0.05% to about 2% by weight, and in one embodiment about 0.1% to about 0.5% by weight.

The base layer 14 and/or skin layer 16 may contain one or more antiblock additives. These include natural silica, diatomaceous earth, synthetic silica, glass spheres, ceramic particles, calcium carbonate particles, calcium silicate particles, fatty amide particles, aluminum silicate, and the like. Examples of commercially available antiblock additives include those available from A. Schulman under the trade designation Polybatch ABPP05SC which is identified as a concentrate containing 5% by weight amorphous silica dispersed in an ethylene-propylene copolymer. A. Schulman CABL 4040, which is in the form of solid pellets containing 5% silicate and 5% ceramic microspheres with the remainder being a low density polyethylene carrier, can be used. Schulman AB5, which is an antiblock concentrate available from A. Schulman which comprises 5% solid synthetic amorphous silica in 95% low density polyethylene, can also be used. Polybatch F-20, which is available from A. Schulman and is identified as concentrate containing 20% natural silica based in low density polyethylene, can be used. Other useful additives include those available from Zeelan Industries under the trade designation Zeeospheres; 3M under the trade designation Scotchlite Glass Bubbles; Potters Industries under the trade designation Spheriglass; Mo-Sci Corporation under the trade designation Precision Glass Spheres (Class IV); Huber under the trade designation Huber Q; Nyco Minerals under the trade designations Nycor, Nyad, Ultrafibe, Primglos, Nyglos and Wallastocoat; Jayco under the trade designation Dragonite; Witco under the trade designation Kenamide; and U.S. Silica under the trade designation Min-U-Sil. The antiblock additive may be used at a concentration of up to about 20% by weight, and in one embodiment about 0.1% to about 10% by weight, and in one embodiment about 0.5% to about 5% by weight.

The antiblock and slip additives may be added together in the form of a resin concentrate. An example of such a concentrate is available from DuPont under the tradename Elvax CE9619-1. This resin concentrate contains 20% by weight silica, 7% by weight of an amide slip additive, and 73% by weight of Elvax 3170(a product of DuPont identified as an ethylene/vinyl acetate copolymer having a vinyl acetate content of 18% by weight). The amount of antiblock and slip additives may be the same or different in each layer. Generally it is desireable to minimize the amount of these additives to avoid ink adhesion and low heat seal bond problems. However, a sufficient amount to prevent blocking of self wound rolls of film is usually desirable.

The base layer 14 and/or skin layer 16 may contain a minor amount of an adhesive resin to enhance the adhesion of the base layer 14 and skin layer 16 to each other. The adhesive resin in the base layer 14 can also be used to enhance the adhesion of the base layer 14 to the water-absorbent film layer 12. The adhesive resin may be an ethylene/vinyl acetate copolymer. These include DuPont Elvax 3170 and 3190LG. The adhesive resins available from DuPont under the tradename Bynel may be used. The adhesive resin may be used at a concentration of up to about 100% by weight, and in one embodiment about 45% to about 85% by weight of the base layer 14 and/or skin layer 16. Also, or alternatively, a tie layer may be positioned between the base layer 14 and skin layer 16. Also, tie layer 18 may be positioned between the base layer 14 and the water-absorbent film layer 12. The tie layers are used to enhance the adhesion of the skin layer 16 and/or the water-absorbent film layer 12 to the base layer 14. The tie layers may be comprised of one of the above mentioned adhesive resins, or one or more of the heat-activatable activatable adhesive materials discussed above as being useful in making the skin layer 16. The tie layers may be comprised of one of the mixtures of heat-activatable adhesive materials and film-forming thermoplastic materials described above as being useful in forming the skin layer 16. Each tie layer may have a thickness of about 5% to about 40% of the thickness of the base layer 14, and in one embodiment about 10% to about 25%.

The base layer 14 and/or skin layer 16 may contain ultraviolet (UV) light absorbers or other light stabilizers. These additives are included to prevent degradation due to sunlight. These additives include hindered amine light stabilizers such as those described in U.S. Pat. No. 4,721,531, which is incorporated herein by reference. The hindered amine light stabilizers include derivatives of 2,2,6,6-tetraalkyl piperidines or substituted piperizinediones. Hindered amine light stabilizers that are useful are available commercially from Ciba-Geigy Corporation under the trade designations "Tinuvin" and "Chemassorb", and from Cytec under the general designation "Cyasorb-UV." UV light absorbers that are useful include those available from Ciba-Geigy under the "Tinuvin" name and Great Lakes Chemical Corporation under the trade designation "Lowilite." The concentration of UV absorber or light stabilizer may be up to about 1% by weight, and in one embodiment about 0.1% to about 0.5% by weight.

The water-absorbent film layer 12 and base layer 14 may be formed by simultaneous coextrusion from two or more extruders and a suitable coextrusion die whereby the water-absorbent film layer 12 and base layer 14 are adhered to each other in a permanently combined state to provide a unitary coextrudate. As indicated above, skin layer 16 and one or more tie layers of an adhesive resin, including tie layer 18, may be used. These layers may be coextruded with the water-absorbent film layer 12 and base layer 14. Alternatively, coating processes known in the art may be used to lay down the base layer 14 as well as the other layers mentioned above onto a moving web. Also, when the base layer 14 is not a polymeric film, the water-absorbent film layer, and other layers, can be applied using coating processes known in the art. The coating processes include gravure, reverse gravure, offset gravure, roller coating, brushing, knife-over roll, metering rod, reverse roll coating, doctor knife, dipping, die coating, curtain coatings, spraying, and the like.

The adhesive layer 20 may be comprised of any adhesive known in the art for making film constructions, including tapes, labels, and the like. The adhesive layer 20 may be comprised of a moisture-activatable adhesive or a pressure sensitive adhesive. These adhesives may be coated on to the inventive water-absorbent film construction using known techniques. The adhesive layer 20 may have a thickness of about 0.1 to about 2 mils, and in one embodiment about 0.25 to about 1 mil.

The moisture-activatable adhesives are non-tacky to the touch until activated. Once activated, by contact with moisture, they become pressure sensitive adhesives. The moisture-activatable adhesives include acrylic adhesives which are known in the art. In one embodiment, this adhesive may be a polymer derived from a monomer mixture comprising alkyl acrylates wherein the alkyl group contains about 4 to about 8 carbon atoms, methyl acrylate, vinyl acetate, and methacrylic acid or acrylic acid. These adhesives are described in U.S. Pat. No. 6,124,417, which is incorporated herein by reference. The pressure-sensitive adhesive can be any pressure sensitive adhesive known in the art. These adhesives are tacky to the touch. The pressure-sensitive adhesives include rubber based adhesives, acrylic adhesives, vinyl ether adhesives, silicone adhesives, and mixtures of two or more thereof. These adhesives may be hot melt, solvent-based or water based adhesives. The pressure sensitive adhesives may contain as a major constituent an adhesive polymer such as acrylic-type polymers; block copolymers; natural, reclaimed, or styrene-butadiene rubbers; tackified natural or synthetic rubbers; or random copolymers of ethylene and vinyl acetate, ethylene-vinyl-acrylic terpolymers, polyisobutylene, poly (vinyl ether), etc. Other materials may be included in the pressure sensitive adhesive such as tackifying resins, plasticizers, antioxidants, fillers, pigments, waxes, etc.

The release liner 22 is comprised of a backing liner 24 and a layer of a cured release coating 26 adhered to side 24a of backing liner 24. The release coating 26 is in contact with the adhesive layer 20 when the release liner 22 is adhered to the inventive water-absorbent construction. The release coating 26 can be made using any release coating composition known in the art. Silicone release coating compositions are useful. The silicone release coating compositions are typically comprised of polyorganosiloxanes and, more often, polydimethylsiloxanes. The silicone release coating composition may be room temperature cured, thermally cured, or radiation cured. Generally, the room temperature and thermally curable compositions contain at least one polyorganosiloxane and at least one catalyst (or curing agent) for the polyorganosiloxane. These compositions may also contain at least one cure accelerator and/or adhesion promoter (sometimes referred to as an anchorage additive). As is known in the art, some materials have the capability of performing both functions, i.e., the capability of acting as a cure accelerator to increase the rate, reduce the curing temperature, etc., and also as an adhesion promoter to improve bonding of the silicone composition to the substrate.

The backing liner 24 may comprise paper, polymer film, or a combination thereof. Any of the paper, polymer films, or combinations thereof, discussed above as being useful as the base layer 14 can be used as the backing liner 24. Paper liners are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the liner. Although paper of any weight can be employed as the liner material, paper having a basis weight in the range of about 30 to about 120 lb/ream may be used, and papers having a basis weight in the range of about 60 to about 100 lb/ream may be used.

The release coating 26 may be applied to the backing liner 24 and cured using known techniques. The application techniques include gravure, reverse gravure, offset gravure, roller coating, brushing, knife-over roll, metering rod, reverse roll coating, doctor knife, dipping, die coating, spraying, curtain coating, and the like. The coat weight of the release coating 26 may be in the range of about 0.1 grams per square meter (gsm) to about 10 gsm or more, and in one embodiment about 0.3 gsm to about 2 gsm. The thickness of the release liner 22 may range from about 4 mils to about 10 mils, and in one embodiment from about 4 mils to about 6 mils.

In the following examples, as well as throughout the specification and claims, unless otherwise indicated, all parts and percentages are by weight.

EXAMPLE 1

A water-absorbent film construction corresponding to film construction 10A in FIG. 2 is coextruded. The overall thickness of the film construction is 3.2 mils. The composition and thickness of each of the layers is as follows:

| Water-absorbent film layer 12 (0.46 mil): | |
|---|---|
| Aquazol 500 (product of Polymer Chemistry Innovations, Inc. identified as poly (2-ethyl-2-oxazoline) having a molecular weight of 500,000, a polydispersity in the range of 3–4, and a kinematic viscosity of 60–80 cSt) | 70.0% |
| Bynel CXA 2002 (product of DuPont identified as anhydride modified ethylene vinyl acetate adhesive resin) | 15.0% |
| DS6D81 (product of Dow identified as ethylene-propylene copolymer) | 14.0% |
| Polybatch ABPP05SC (product of A. Schulman Inc. identified as a concentrate containing 5% amorphous silica dispersed in an ethylene-propylene copolymer) | 1% |
| Base Layer 14 (2.28 mil) | |
| 5A97 (product of Dow identified as a polypropylene homopolymer) | 100% |
| Skin Layer 16 (0.46 mil) | |
| DS6D81 | 91.5% |
| Sper 6 (product of A. Schulman Inc. identified as a concentrate containing 6% of an unsaturated $C_{17}$ fatty acid amide dispersed in polypropylene) | 4.5% |
| Polybatch ABPP05SC | 4.0% |

This film construction is useful as an ink receptive film construction, the ink receptive layer being the water-absorbent film layer 12. This film construction may be used to make the writable document protector assembly 110 depicted in FIGS. 7 and 8.

EXAMPLE 2

A water-absorbent film construction corresponding to film construction 10B in FIG. 3 is coextruded. This film is useful as a water absorbing anti-static surface film for non-pressure sensitive adhesive applications. It is also useful as a non-skid or non-slip printable film for use with floor tile. This film can be used as an adhesive for use with paper laminates. The overall thickness of the film construction is 3.00 mils. The composition and thickness of each layer is as follows:

| Water-absorbent film layer 12 (0.30 mil) | |
|---|---|
| Aquazol 500 | 75.0% |
| TC120 (product of ExxonMobil identified as an ethylene methyl acrylate copolymer) | 24.0% |
| Polybatch ABPP05SC | 1.0% |
| Tie layer 18 (0.30 mil): | |
| TC120 | 50.0% |
| 5A97 | 50.0% |
| Base layer 14 (2.40 mil): | |
| 5A97 | 95.0% |
| Polybatch ABPF05SC | 2.5% |
| Sper 6 | 2.5% |

EXAMPLE 3

A water-absorbent film construction corresponding to film construction 10C in FIG. 4 is coextruded. This film is useful as a water absorbing anti-static surface film for pressure sensitive adhesive applications. It is useful as a non-skid or non-slip printable film for floor tile. This film can also be used as an adhesive for use with paper laminates. The overall thickness of the film construction is 3.00 mils. The composition and thickness of each layer is as follows:

| Water-absorbent film layer 12 (0.30 mil) | |
|---|---|
| Aquazol 500 | 75.0% |
| TC120 | 24.0% |
| Polybatch ABPP05SC | 1.0% |
| Tie layer 18 (0.30 mil): | |
| TC120 | 50.0% |
| 5A97 | 50.0% |
| Base layer 14 (2.10 mil): | |
| 5A97 | 70.0% |
| TC120 | 30.0% |
| Skin layer 16 (0.30 mil) | |
| 5A97 | 50.0% |
| TC120 | 50.0% |

EXAMPLE 4

A water-absorbent film construction corresponding to film construction 10 in FIG. 1 is coextruded. This film is useful as a water absorbing anti-static surface film for non-pressure sensitive adhesive applications. The overall thickness of the film construction is 2.70 mils. The composition and thickness of each layer is as follows:

| Water-absorbent film layer 12 (0.30 mil) | |
|---|---|
| Aquazol 500 | 75.0% |
| TC120 | 24.0% |
| Polybatch ABPP05SC | 1.0% |
| Base layer 14 (2.40 mil): | |
| 5A97 | 70.0% |
| TC120 | 25.0% |

-continued

| | |
|---|---|
| Polybatch ABPF05SC | 2.5% |
| Sper 6 | 2.5% |

EXAMPLE 5

A water-absorbent film construction corresponding to film construction 10A in FIG. 2 is coextruded. This film is useful as a water absorbing anti-static surface film for pressure sensitive adhesive applications. The overall thickness of the film construction is 3.00 mils. The composition and thickness of each layer is as follows:

| Water-absorbent film layer 12 (0.30 mil) | |
|---|---|
| Aquazol 500 | 75.0% |
| TC120 | 24.0% |
| Polybatch ABPP05SC | 1.0% |
| Base layer 14 (2.40 mil): | |
| 5A97 | 70.0% |
| TC120 | 25.0% |
| Polybatch ABPF05SC | 2.5% |
| Sper 6 | 2.5% |
| Skin layer 16 (0.30 mil): | |
| 5A97 | 50.0% |
| TC120 | 50.0% |

EXAMPLE 6

A water-absorbent film construction corresponding to film construction 10B in FIG. 3 is coextruded. This film is useful as a non-skid or non-slip printable film for use with floor tile wherein non-pressure sensitive adhesive applications are desired. The overall thickness of the film construction is 3.00 mils. The composition and thickness of each layer is as follows:

| Water-absorbent film layer 12 (0.30 mil) | |
|---|---|
| Aquazol 500 | 60.0% |
| TC120 | 24.0% |
| CABL 4040 (product of A. Schulman identified as solid pellets containing 5% silicate, 5% ceramic microspheres with the remainder being a low density polyethylene carrier) | 15.0% |
| Polybatch ABPP05SC | 1.0% |
| Tie layer 18 (0.30 mil): | |
| TC120 | 50.0% |
| 5A97 | 50.0% |
| Base layer 14 (2.40 mil): | |
| 5A97 | 95.0% |
| Polybatch ABPF05SC | 2.5% |
| Sper 6 | 2.5% |

EXAMPLE 7

A water-absorbent film construction corresponding to film construction 10C in FIG. 4 is coextruded. This film is useful as a non-skid or non-slip printable film for floor tile wherein pressure sensitive adhesive applications are desired. The overall thickness of the film construction is 3.00 mils. The composition and thickness of each layer is as follows:

| Water-absorbent film layer 12 (0.30 mil) | |
|---|---|
| Aquazol 500 | 60.0% |
| TC120 | 24.0% |
| CABL 4040 | 15.0% |
| Polybatch ABPP05SC | 1.0% |
| Tie layer 18 (0.30 mil): | |
| TC120 | 50.0% |
| 5A97 | 50.0% |
| Base layer 14 (2.10 mil): | |
| 5A97 | 70.0% |
| TC120 | 30.0% |
| Skin layer 16 (0.30 mil) | |
| 5A97 | 50.0% |
| TC120 | 50.0% |

EXAMPLE 8

A water-absorbent film construction corresponding to film construction 10B in FIG. 3 is coextruded. This film is useful as an adhesive film for paper laiminates. The overall thickness of the film construction is 3.00 mils. The composition and thickness of each layer is as follows:

| Water-absorbent film layer 12 (0.30 mil) | |
|---|---|
| Aquazol 500 | 50.0% |
| EVAL F101 (a product of Evalco identified as an ethylene vinyl alcohol copolymer) | 25% |
| TC120 | 24.0% |
| Polybatch ABPP05SC | 1.0% |
| Tie layer 18 (0.30 mil): | |
| TC120 | 50.0% |
| 5A97 | 50.0% |
| Base layer 14 (2.40 mil): | |
| 5A97 | 95.0% |
| Polybatch ABPF05SC | 2.5% |
| Sper 6 | 2.5% |

EXAMPLE 9

A water-absorbent film construction corresponding to film construction 10C in FIG. 4 is coextruded. This film is useful as an adhesive for pressure sensitive adhesive applications. The overall thickness of the film construction is 3.00 mils. The composition and thickness of each layer is as follows:

| Water-absorbent film layer 12 (0.30 mil) | |
|---|---|
| Aquazol 500 | 50.0% |
| EVAL F101 | 25.0% |
| TC120 | 24.0% |
| Polybatch ABPP05SC | 1.0% |
| Tie layer 18 (0.30 mil): | |
| TC120 | 50.0% |
| 5A97 | 50.0% |
| Base layer 14 (2.10 mil): | |
| 5A97 | 70.0% |
| TC120 | 30.0% |

-continued

| Skin layer 16 (0.30 mil) | |
|---|---|
| 5A97 | 50.0% |
| TC120 | 50.0% |

In one embodiment, the invention further comprises a write-on sheet protector, such as the write-on sheet protector 110 depicted in FIGS. 7 and 8, which is made using the inventive water-absorbent film construction. The water-absorbent film constructions 10A and 10C depicted in FIGS. 2 and 4 are particularly suitable for this use. When forming the sheet protector 110 the water-absorbent film layer 12 forms the outer surface of the sheet protector and functions as an ink receptive substrate. The skin layer 16 forms the inner surface of the sheet protector. Referring to FIGS. 7 and 8, the write-on sheet protector 110 includes an upper transparent plastic sheet 112 and a lower transparent plastic sheet 114. These two sheets may be formed from a single sheet folded over at the outer edge 116, or alternatively can be made of two overlying sheets. The sheet protector 110 is open at the top edge, as shown in FIG. 7, and heat sealed along the lower edge 118. The sheet protector 110 is heat sealed along thermo-sealing lines 120 and 122 with an extra reinforcing strip 124 mounted between the thermo-sealing lines 120 and 122. The reinforced left edge of the sheet protector 110 may be provided with holes 126 for convenience in mounting the sheet protector 110 into a ringed binder. Formed within the sheet protector 110 is a pocket or envelope suitable for receiving a document (e.g., sheet of paper, photograph; letter, drawing, etc.).

The heat sealing may be accomplished by applying a heated die to the double layer material. The heat sealing may be in the form of a series of welds with spaces between the welds to allow for the easy insertion of sheet material. Alternatively, instead of thermal bonding, the edges may be secured together in any desired manner, such as by high frequency welding or by a thin line of permanent adhesive or by other known techniques.

In one embodiment, the sheet protector 110 is approximately 9 inches in width and about 11-1/8 inches in its longer dimension. The reinforcing strip 124 may be about 3/8 inch wide. The envelope or pocket formed within the sheet protector 110 is large enough to receive an unfolded sheet, 8½ inches by 11 inches in size.

Referring to FIG. 7, within the envelope or pocket formed within the sheet protector 110 is a letter 132 which is protected from damage by the sheet protector 110. Written on the outer surface of the sheet protector 110 in ink are certain legends 134 calling attention to certain passages or parts in the letter 132. Thus, by using the sheet protector 110, written comments may be made on the outer surface of the sheet protector relative to the letter 132 without defacing the letter itself. Subsequently, if desired, the original letter 132 may be withdrawn from the sheet protector 110. Instead of the letter 132, a photograph, drawing or other document can be placed in the envelope.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A write-on sheet protector, comprising:
an envelope having an outer surface and an inner surface and being formed of a transparent coextruded sheet material;
the sheet material comprising
a water-absorbent film layer having a 2-oxazoline polymer concentration of at least about 40% by weight,
a base layer, the base layer having a first side and a second side, the water-absorbent film layer overlying the first side of the base layer, and
a skin layer overlying the second side of the base layer;
the skin layer forming the inner surface of the envelope;
the water-absorbent film layer forming the outer surface of the envelope;
the outer surface of the envelope being an ink receptive surface.

2. The sheet protector of claim 1 wherein the envelope is formed from one sheet of the sheet material, the sheet material being folded over to form one sealed edge of the envelope, the sheet material being sealed along two additional edges of the envelope, one edge of the envelope being open.

3. The sheet material of claim 1 wherein the envelope is formed from two overlying sheets of the sheet material, the two sheets of sheet material being sealed along three edges to form the envelope, one edge of the envelope being open.

4. The sheet protector of claim 1 wherein the envelope has three sealed edges and the sheet protector further comprises a reinforcing strip mounted on one of the sealed edges.

5. The sheet protector of claim 4 wherein the sheet protector further comprises one or more holes in the reinforcing strip for mounting the sheet protector in a ringed binder.

6. The sheet protector of claim 1 wherein the sheet protector further comprises a tie layer positioned between the water-absorbent film layer and the base layer.

7. The sheet protector of claim 6 wherein the tie layer is comprised of a heat-activatable adhesive material, or a mixture of a heat-activatable adhesive material and a thermoplastic film-forming material.

8. The sheet protector of claim 7 wherein the heat-activatable adhesive material is a polymer containing carbonyl, hydroxyl groups, or a combination of carbonyl and hydroxyl groups.

9. The sheet protector of claim 7 wherein the heat-activatable adhesive material is a polyamide, a polyester copolymer, an ionomer based on sodium or zinc salts of ethylene methacrylic acid, a polyacrylontrile, an ethylene vinyl acetate copolymer, an ethylene methacrylic acid copolymer, an ethylene methylacrylate copolymer, an ethylene acrylic acid copolymer, an ethylene ethyl acrylate copolymer, or a mixture of two or more thereof.

10. The sheet protector of claim 7 wherein the thermoplastic film-forming material is a polymer or copolymer of an olefin monomer.

11. The sheet protector of claim 7 wherein the thermoplastic film-forming material is comprised of polypropylene or a copolymer of ethylene and propylene.

12. The sheet protector of claim 6 wherein the tie layer is comprised of a mixture of polypropylene and ethylene methylacrylate copolymer.

13. The sheet protector of claim 1 wherein a tie layer is positioned between the water-absorbent film layer and the base layer, and a skin layer overlies the second side of the base layer.

14. The sheet protector of claim 1 wherein a skin layer overlies the second side of the base layer, and an adhesive layer overlies the skin layer.

15. The sheet protector of claim 14 wherein the adhesive layer is comprised of a pressure sensitive adhesive, and a release liner overlies the pressure sensitive adhesive.

16. The sheet protector of claim 15 wherein the release liner is comprised of a release coating and a backing liner, the release coating being positioned between the pressure sensitive adhesive and the backing liner.

17. The sheet protector of claim 1 wherein the 2-oxazoline polymer contains repeating units represented by the formula:

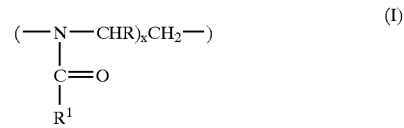

wherein: R is hydrogen or an alkyl group of 1 to about 4 carbon atoms; $R^1$ is hydrogen, a phenyl group or an alkyl group of 1 to about 4 carbon atoms; and x is 1 or 2.

18. The sheet protector of claim 1 wherein the 2-oxazoline polymer is poly(2-ethyl-2-oxazoline).

19. The sheet protector of claim 1 wherein the water-absorbent film layer further comprises at least one additional water-soluble polymer.

20. The sheet protector of claim 1 wherein the water-absorbent film layer further comprises at least one water-insoluble polymer.

21. The sheet protector of claim 1 wherein the water-absorbent film layer further comprises at least one compatibilizing agent.

22. The sheet protector of claim 1 wherein the base layer comprises a single-layered construction.

23. The sheet protector of claim 1 wherein the base layer comprises a multi-layered construction.

24. The sheet protector of claim 1 wherein the base layer comprises foil, paper, polymer film, textile, or a combination thereof.

25. The sheet protector of claim 1 wherein the base layer is comprised of a polymeric film.

26. The sheet protector of claim 1 wherein the base layer is comprised of a multi-layered polymeric film.

27. The sheet protector of claim 1 wherein the water-absorbent film layer and the base layer are comprised of a coextrudate.

28. The sheet protector of claim 1 wherein the skin layer is comprised of a heat-activatable adhesive material, a thermoplastic film-forming material, or a mixture thereof.

29. The sheet protector of claim 28 wherein the heat-activatable adhesive is a polymer containing carbonyl groups, hydroxyl groups, or a combination of carbonyl and hydroxyl groups.

30. The sheet protector of claim 28 wherein the heat-activatable adhesive material is a polyamide, a polyester copolymer, an ionomer based on sodium or zinc salts of ethylene methacrylic acid, a polyacrylontrile, an ethylene vinyl acetate copolymer, an ethylene methacrylic acid copolymer, an ethylene methylacrylate copolymer, an ethylene acrylic acid copolymer, an ethylene ethyl acrylate copolymer, or a mixture of two or more thereof.

31. The sheet protector of claim 28 wherein the thermoplastic film-forming material is a polymer or copolymer of an olefin monomer.

32. The sheet protector of claim 28 wherein the thermoplastic film-forming material is comprised of polypropylene or a copolymer of ethylene and propylene.

33. The sheet protector of claim 1 wherein the skin layer is comprised of a mixture of polypropylene and ethylene methylacrylate copolymer.

* * * * *